(12) United States Patent
Takahashi et al.

(10) Patent No.: US 8,567,666 B2
(45) Date of Patent: Oct. 29, 2013

(54) LIGHT GUIDING DEVICE, READER/WRITER DEVICE FOR NONCONTACT COMMUNICATION MEDIUM, AND ELECTRONIC APPARATUS

(75) Inventors: Takayuki Takahashi, Kanagawa (JP); Ryota Minami, Kanagawa (JP); Kenya Yasutomi, Kanagawa (JP); Takayuki Konishi, Tokyo (JP)

(73) Assignee: Panasonic Corporation, Osaka (JP)

( * ) Notice: Subject to any disclaimer, the term of this patent is extended or adjusted under 35 U.S.C. 154(b) by 21 days.

(21) Appl. No.: 13/611,795

(22) Filed: Sep. 12, 2012

(65) Prior Publication Data

US 2013/0001307 A1  Jan. 3, 2013

Related U.S. Application Data

(63) Continuation of application No. 12/919,876, filed as application No. PCT/JP2009/000819 on Feb. 25, 2009, now Pat. No. 8,348,156.

(30) Foreign Application Priority Data

Feb. 29, 2008  (JP) .................................. 2008-049817

(51) Int. Cl.
G07F 19/00 (2006.01)

(52) U.S. Cl.
USPC ........................................................ 235/379

(58) Field of Classification Search
USPC .................................. 235/382, 379, 439, 451
See application file for complete search history.

(56) References Cited

U.S. PATENT DOCUMENTS

| 5,369,263 | A | 11/1994 | Nair et al. | |
|---|---|---|---|---|
| 7,516,887 | B2* | 4/2009 | Arakaki et al. | 235/381 |
| 2005/0092831 | A1* | 5/2005 | Sandoval et al. | 235/382 |
| 2009/0321510 | A1* | 12/2009 | Day et al. | 235/375 |
| 2010/0252622 | A1* | 10/2010 | Bedore | 235/380 |
| 2012/0168503 | A1* | 7/2012 | Phillips | 235/439 |
| 2012/0168504 | A1* | 7/2012 | Phillips | 235/439 |

FOREIGN PATENT DOCUMENTS

| CN | 1692292 A | 11/2005 |
|---|---|---|
| CN | 101105600 A | 1/2008 |
| DE | 3528558 A1 | 2/1987 |
| JP | 09-319847 A | 12/1997 |

(Continued)

OTHER PUBLICATIONS

Chinese Office action for application 200980106875.7 dated Sep. 5, 2012.

(Continued)

*Primary Examiner* — Christle Marshall
(74) *Attorney, Agent, or Firm* — Pearne & Gordon LLP

(57) ABSTRACT

A light guiding device used for a reader/writer device for a noncontact communication medium is provided with a light guide plate having a transparent main body part which can transmit light inputted from an LED and a protruding part protruding from a part of an end surface of the transparent main body part. A diffusely reflecting part is provided on a lower surface side of the transparent main body part, and a first light emitting part is provided on an upper surface side of the transparent main body part. Reflecting parts are provided on an upper surface side and a lower surface side of the protruding part, and second light emitting part is provided at a leading end. of the protruding part. When the first light emitting part is covered by the noncontact communication medium, the second light emitting part can check a light emitting state.

33 Claims, 8 Drawing Sheets

(56) References Cited

FOREIGN PATENT DOCUMENTS

| | | |
|---|---|---|
| JP | 11-265609 A | 9/1999 |
| JP | 2000-132645 A | 5/2000 |
| JP | 2000-258633 A | 9/2000 |
| JP | 2001-266084 A | 9/2001 |
| JP | 2003-297107 A | 10/2003 |
| JP | 2005-084794 A | 3/2005 |
| JP | 3700904 B2 | 7/2005 |
| JP | 2006-323615 A | 11/2006 |
| JP | 2007-140870 A | 6/2007 |
| JP | 2007-257483 A | 10/2007 |
| JP | 3137387 U | 10/2007 |
| JP | 2009-070654 A | 4/2009 |
| WO | 2004/055559 A1 | 7/2004 |

OTHER PUBLICATIONS

International Search Report for PCT/JP2009/000819 dated May 12, 2009.

Japanese Office action for application No. 2012-244281; dated Jul. 23, 2013.

* cited by examiner

LIGHT GUIDING DEVICE, READER/WRITER DEVICE FOR NONCONTACT COMMUNICATION MEDIUM, AND ELECTRONIC APPARATUS

RELATED APPLICATIONS

This application is a continuation of U.S. patent application Ser. No. 12/919,876 filed Aug. 27, 2010, which is incorporated herein by reference in its entirety.

TECHNICAL FIELD

The present invention relates to a light guiding device which is used for an electronic apparatus such as a reader/writer device for a noncontact communication medium.

BACKGROUND ART

Up to now, an electronic apparatus which communicates with a noncontact communication medium has been put into practical use. Examples of the typical. noncontact communication medium include a credit. card, a debit card, and a card-type passenger ticket (commuter pass and prepaid passenger ticket) which use an RF-ID (Radio Frequency Identification) technology. These noncontact communication mediums are used for various purposes such as small-amount settlement, room entry/exit management, and product distribution management.

The electronic apparatus of this type conventionally includes a loop antenna and a communication circuit (guide-type read/write communication part) which communicates with a noncontact communication medium via the loop antenna. Then, the guide-type read/write communication part transmits electric power and transmission data constantly or intermittently, and obtains reception data from a noncontact communication medium located within a receivable range of the electric power and the transmission data, to thereby perform information processing with the noncontact communication medium. Such a technology is disclosed in, for example, Japanese. Patent Laid-Open No. 09-319847. Then, a light emitting part incorporated in the guide-type read/write communication part changes a light emitting state thereof to announce a standby state of communication with the noncontact communication medium and a result of information processing (display of a state such as read/write success or read/write failure) with the noncontact communication medium. Such a technology is disclosed in, for example, Japanese Patent Laid-Open No. 2006-323615 and Japanese. Patent Laid-Open No. 2005-84794.

However, in a conventional reader/writer device for a noncontact communication medium, in the case where an area of a reader/writer part is made smaller than that of the noncontact communication medium in order to downsize the device, when the noncontact communication medium is held over the reader/writer part, an entire surface of the reader/writer part is covered by the noncontact communication medium. As a result, even if a light emitting part incorporated in the reader/writer part changes a light emitting state thereof to announce a result of information processing (a state such as read/write success or read/write failure) with the noncontact communication medium, it is difficult to check the announcement (emission of blue color light, red color light, or the like).

DISCLOSURE OF THE INVENTION

Problem to be Solved by the Invention

The present invention has been made under the above-mentioned circumstances. The present invention has an object to provide a light guiding device in which a light emitting state of a light emitting part can be easily checked.

Means for Solving the Problem

One aspect of the present invention provides a light guiding device. The light guiding device includes: a light guide, late including: a transparent main body part which can transmit light inputted from a light source; and a protruding part which is provided so as to protrude from a part of an end surface of the transparent main body part; a diffusely reflecting part which is provided on a lower surface side of the transparent main body part; a light emitting planar part which corresponds to a first light emitting part and is provided on an upper surface side of the transparent main body part; reflecting parts which are provided on a portion of the end surface of the transparent main body part on which the protruding part is not provided and on an upper surface side, a lower surface side, and both side surface sides of the protruding part; and a light emitting end part which corresponds to a second light emitting part and is provided at a leading end of the protruding part.

Another aspect of the present invention provides a reader/writer device for a noncontact communication medium. The reader/writer device, for the noncontact communication medium includes: the above-mentioned light guiding device; a reader/writer part which performs information processing with the noncontact communication medium; an input operation part which performs a data input operation for the information processing with the noncontact communication medium; the first light emitting part which is included in the light guiding device, and changes a light emitting state thereof at a time of the information processing with the noncontact communication medium; and the second light emitting part which is included in the light guiding device, is disposed in a vicinity of the input operation part at a position apart from the first light emitting part, and operates together with the first light emitting part to change an illumination state thereof.

Still another aspect of the present invention provides an electronic apparatus. The electronic apparatus includes the above-mentioned light guiding device.

Further another aspect of the present invention provides an electronic apparatus. The electronic apparatus includes the above-mentioned reader/writer device for the noncontact communication medium.

As described below, the present invention has other aspects. Accordingly, this disclosure of the invention is intended to provide a part of the aspects of the present invention, and is not intended to limit the scope of the invention which is described and claimed herein.

Figure 1:
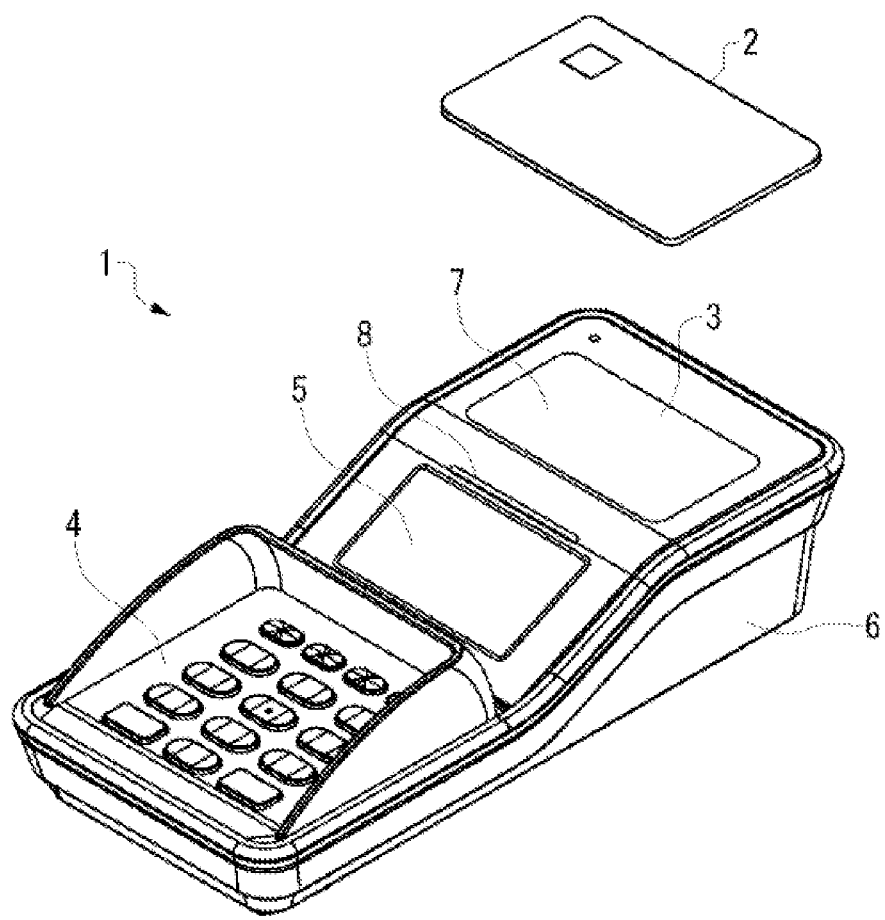
FIG. 1 is a perspective view of a reader/writer device for a noncontact communication medium according to an embodiment of the present invention.

DESCRIPTION OF SYMBOLS 1 reader/writer device for noncontact communication medium
2 noncontact communication medium
3 reader/writer part
4 input operation part
7 first light emitting part (light emitting planar part)
8 second light emitting part (light emitting end part)
9 LED (light source)
10 light guide plate
11 transparent main body part
18 protruding part
19 diffusely reflecting part
21 reflecting part
22 light entrance part
23 light direction change part

BEST MODE FOR CARRYING OUT THE INVENTION

Hereinafter, detailed description of the present invention is given. It should be noted that the following detailed description and the attached drawings do not limit the present invention. The scope of the invention is defined by the attached claims instead.

A light guiding device according to the present invention includes: a light guide plate including: a transparent main body part which can transmit light inputted from a light source; and a protruding part which is provided so as to protrude from a part of an end surface of the transparent main body part; a diffusely reflecting part which is provided on a lower surface side of the transparent main body part; a light emitting planar part which corresponds to a first light emitting part and is provided on an upper surface side of the transparent main body part; reflecting parts which are provided on a portion of the end surface of the transparent main body part on which the protruding part is not provided and on an upper surface side, a lower surface side, and both side surface sides of the protruding part; and a light emitting end part which corresponds to a second light emitting part and is provided at a leading end of the protruding part.

With this configuration, the light inputted from the light source is diffusely reflected by the diffusely reflecting part of the transparent main body part, so that the light emitting planar part (first light emitting part) on the upper surface side of the transparent main body part emits light. At the same time, the light inputted from the light source is transmitted through the transparent main body part, so that the light emitting end part (second light emitting part) at the leading end of the protruding part emits light. At this time, because the reflecting parts are provided on the portion of the end surface of the transparent main body part on which the protruding part is not provided and on the upper surface side, the lower surface side, and the both side surface sides of the protruding part, it is possible to prevent the light from leaking to the outside through a portion other than the leading end (light emitting end part) of the protruding part, which enables suppressing a reduction in light amount of the light emitting end part. In a reader/writer device for a noncontact communication medium using the light guiding device as described above, in the case where an area of the light emitting planar part (first light emitting part) is made smaller than that of the noncontact communication medium, even if an entire surface of a reader/writer part is covered by the noncontact communication medium, the light emitting end part (second light emitting part) makes it possible to easily check a light emitting state indicating a result of information processing with the noncontact communication medium. Accordingly, it is possible to make smaller the area of the light emitting planar part, to thereby downsize the device.

In addition, in the light guiding device, according to the present invention, the light guide plate may include a plurality of the protruding parts which protrude in directions different from each other from the end surface of the transparent main body part, the reflecting parts may be provided on a portion of the end surface of the transparent main body part on which the protruding parts are not provided and on the upper surface side, the lower surface side, and the both side surface sides of each of the plurality of protruding parts, and the light emitting end part may be provided at the leading end of each of the plurality of protruding parts.

With this configuration, the light emitting planar part (first light emitting part) on the upper surface side of the transparent main body part emits light, and at the same time, the light emitting end parts (second light emitting parts) at the leading ends of the plurality of protruding parts emit light. In the reader/writer device for the noncontact communication medium using the light guiding device as described above, the light emitting end parts are provided so as to respectively face a plurality of users, whereby each of the plurality of users can easily check the light emitting state indicating the result of the information processing with the noncontact communication medium. For example, if one of the plurality of light emitting end parts is provided so as to face a shop clerk and another one of the plurality of light emitting end parts is provided so as to face a customer, even if the entire surface of the reader/writer part is covered by the noncontact communication medium, each of the shop clerk and the customer can easily check the light emitting state indicating the result of the information processing with the noncontact communication medium.

In addition, in the light guiding device, according to the present invention, the light guide plate may include a light entrance part through which the light is inputted from the light source disposed on the lower surface side of the transparent main body part, and the transparent main body part may include a light direction change part which changes a direction of the light which has entered through the light entrance part toward the light emitting end part.

With this configuration, the light source can be disposed on the lower surface side of the light guide plate, and hence a degree of freedom in design is enhanced, to thereby downsize the device.

In addition, in the light guiding device according to the present invention, the light emitting end part may be provided on an entire periphery of the end surface of the transparent main body part.

With this configuration, the light emitting end part is provided on the entire periphery of the transparent main body part. Therefore, when the entire surface of the reader/writer part is covered by the noncontact communication medium, each of users in all directions can easily check the light emitting state indicating the result of the information processing with the noncontact communication medium.

A reader/writer device for a noncontact communication medium according to the present invention includes: the above-mentioned light guiding device; a reader/writer part which performs information processing with the noncontact communication medium; an input operation part which performs a data input operation for the information processing with the noncontact communication medium; the first light emitting part which is included in the light guiding device, and changes a light emitting state thereof at a time of the information processing with the noncontact communication medium; and the second light emitting part which is included in the light guiding device, is disposed in a vicinity of the input operation part at a position apart from the first light emitting part, and operates together with the first light emitting part to change an illumination state thereof.

In this reader/writer device for the noncontact communication medium, in the case where the area of the first light emitting part is made smaller than that of the noncontact communication medium, even if the entire surface of the reader/writer part is covered by the noncontact communication medium, the second light emitting part enables a user who performs the data input operation to easily check the light emitting state indicating the result of the information processing with the noncontact communication medium. Accordingly, it is possible to make smaller the area of the first light emitting part, to thereby downsize the device.

In addition, in the reader/writer device for the noncontact communication medium. according to the present invention, the second light emitting part may be disposed between the reader/writer part and the input operation part.

An electronic apparatus according to the present invention includes the above-mentioned light guiding device. In addition, another electronic apparatus according to the present invention includes the above-mentioned reader/writer device for the noncontact communication medium.

According to the present invention, the second light emitting part is provided at the leading end of the protruding part of the light guide plate. Accordingly, in the case where the first light emitting part of the transparent main body part of the light guide plate is covered, the second light emitting part makes it possible to easily check the light emitting state.

Hereinafter, a reader/writer device for a noncontact communication medium using a light guiding device according to an embodiment of the present invention is described with reference to the drawings.

Figure 2:
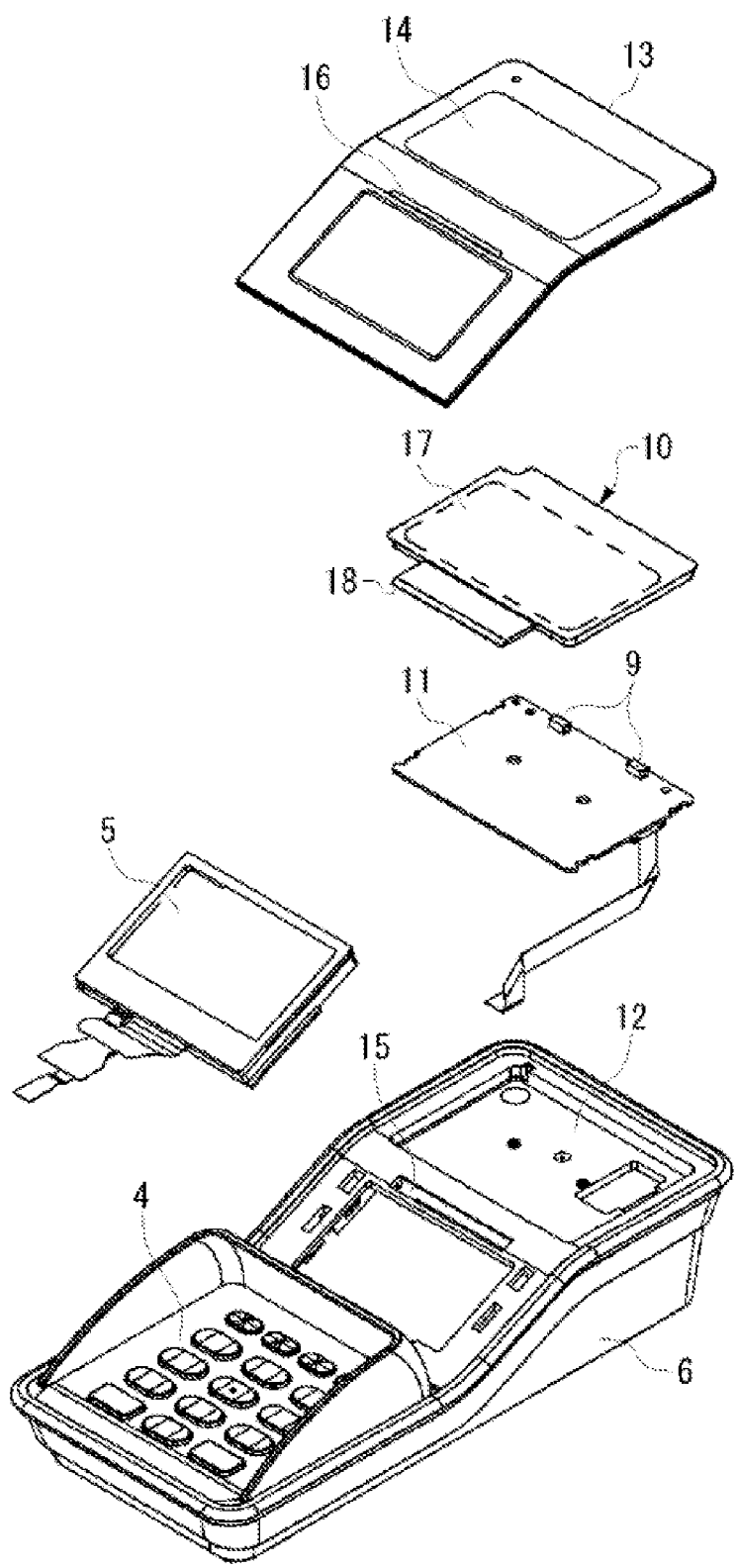
FIG. 2 is an exploded perspective view of the reader/writer device for the noncontact communication medium according to the present embodiment.
Figure 3:
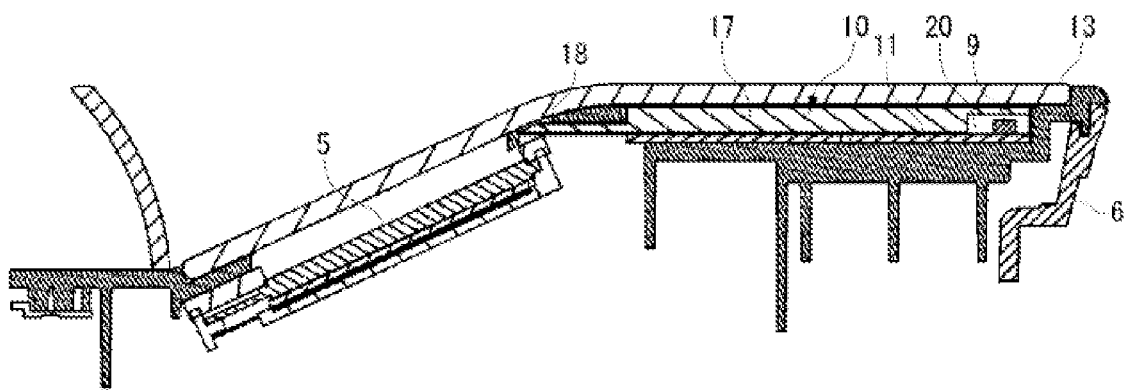
FIG. 3 is a cross sectional view of the reader/writer device for the noncontact communication medium according to the present embodiment.

The reader/writer device for the noncontact communication medium according to the embodiment of the present invention is described with reference to FIG. 1 to FIG. 5. Here, an entire configuration of the reader/writer device for the noncontact communication medium is first described. FIG. 1 is a perspective view of the reader/writer device for the noncontact communication medium. FIG. 2 is an exploded perspective view of the reader/writer device for the noncontact communication medium. FIG. 3 is a cross sectional view of the reader/writer device for the noncontact communication medium.

As illustrated in FIG. 1, a reader/writer device 1 for a noncontact communication medium includes: a reader/writer part 3 for reading a noncontact communication medium 2; an input operation part 4 for performing a data input operation at the time of information processing with the noncontact communication medium 2; and a liquid crystal display part 5 for displaying data items of a result of the information processing with the noncontact communication medium 2, a result of the data input, and the like. The liquid crystal display part 5 is provided in a central part of an upper surface of a case 6 of the reader/writer device 1 for the noncontact communication medium. The reader/writer part 3 is provided in an upper part of the upper surface of the case 6 (the part above the liquid crystal display part 5), and can read the noncontact communication medium 2 in a noncontact manner. In addition, the input operation part 4 is provided in a lower part of the upper surface of the case 6 (the part below the liquid crystal display part 5). The input operation part 4 includes a plurality of input keys, and can be also referred to as a key input part.

The reader/writer device 1 for the noncontact communication medium includes two light emitting parts 7 and 8. The first light emitting part 7 is provided at a position of the reader/writer part 3, and the second light emitting part 8 is provided at a position apart from the reader/writer part 3. In this example, the second light emitting part 8 is provided at a position between the reader/writer part 3 and the input operation part 4 (the part above the liquid crystal display part 5). The two light emitting parts 7 and 8 change light emitting states thereof to announce the result of the information processing (a state such as read/write success or read/write failure) with the noncontact communication medium 2. For example, in the case of the read/write success, the two light emitting parts 7 and 8 emit blue color light at the same time, and in the case of the read/write failure, the two light emitting parts 7 and 8 emit red color light at the same time.

Here, with reference to FIG. 2 and FIG. 3, the configuration of the two light emitting parts 7 and 8 is described in detail. As illustrated in FIG. 2 and FIG. 3, LEDs 9 each serving as a light source and a light guide plate 10 are incorporated on a lower side of the reader/writer part 3 (the lower side in FIG. 3). In this case, the two LEDs 9 are mounted on a substrate 11 (see FIG. 2), and the substrate 11 on which the LEDs 9 are mounted is attached to a substrate housing concave part 12 formed on the upper surface of the case 6. The light guide plate 10 is attached to an upper side of the substrate 11 (the upper side in FIG. 3), and a protection panel 13 is attached to an upper side of the light guide plate 10. The protection panel 13 is provided with a transparent surface window part 14 at a position corresponding to a main body part (a transparent main body part 17 to be described later) of the light guide plate 10, and this constitutes the first light emitting part 7. As described above, the first light emitting part 7 is formed into a planar shape by the main body part of the light guide plate 10, and can be also referred to as a light emitting planar part.

In addition, a part (a protruding part 13 to be described later) of the light guide plate 10 is inserted into a slit 15 of the case 6, and the above-mentioned protection panel 13 is attached to an upper side thereof. The protection panel 13 is also provided with a transparent slit window part 16 at a position corresponding to the part (the protruding part 13 to be described Later) of the light guide plate 10, and this constitutes the second light emitting part 3. As described above, the second light emitting part 3 is formed by an end part of the light guide plate 10, and can be also referred to as a light emitting end part.

Figure 4:
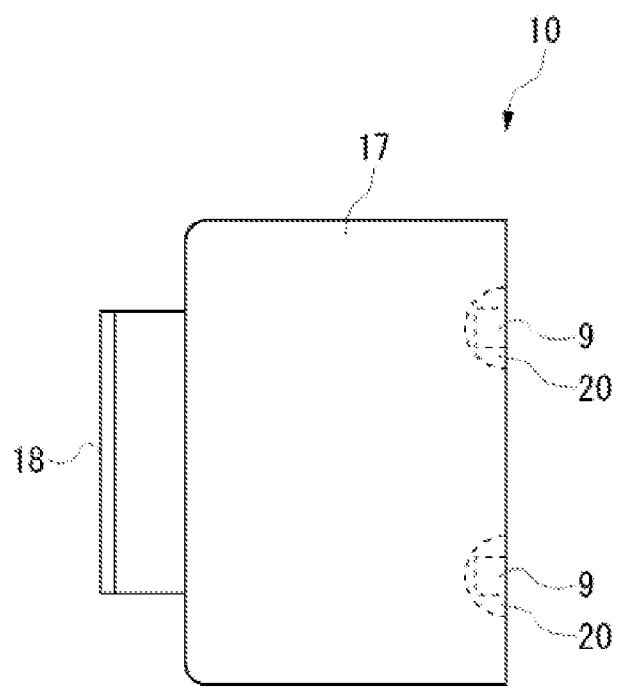
FIG. 4 is a plan view of a light guide plate according to the present embodiment.
Figure 5:
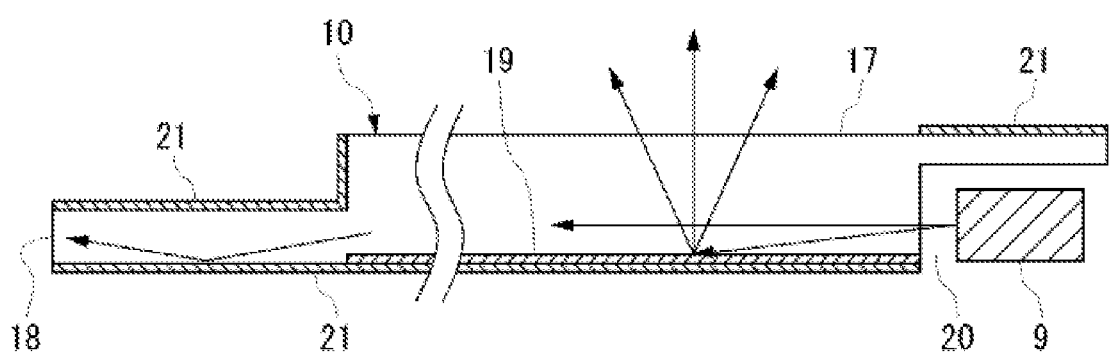
FIG. 5 is a cross sectional view for describing a state where a first light emitting part and a second light emitting part are caused to emit light according to the present embodiment.

Next, with reference to FIG. 4 and FIG. 5, the configuration of the light guide plate 10 is described in detail. FIG. 4 is a plan view of the light guide plate 10, and FIG. 5 is a cross sectional view of the light guide plate 10. As illustrated in FIG. 4 and FIG. 5, the light guide plate 10 includes the transparent main body part 17 having a substantially quadrilateral plate-like shape and the protruding part 12 which is provided so as to protrude from a part of an end surface of the transparent main body part 17. On a lower surface of the transparent main body part 17, a diffusely reflecting part 19 is formed at a position corresponding to the first light emitting part 7. In this example, the lower surface of the transparent main body part 17 is subjected to grain finishing, to thereby form the diffusely reflecting part 19. In addition, on the lower surface of the transparent main body part 17, an LED housing concave part 20 is formed at a position corresponding to each of the LEDs 9. Each of the LEDs 9 mounted on the substrate 11 is housed in the LED housing concave part 20.

In addition, on the lower surface of the transparent main body part 17, a reflecting part 21 is provided at a position corresponding to the first light emitting part 7. In this example, a white tape is attached to the lower surface of the transparent main body part 17, to thereby form the reflecting part 21. It should be noted that, on an upper surface of the transparent main body part 17, the white tape is attached also at a position corresponding to the LED housing concave part 20, to thereby form the reflecting part 21. Further, the white tape is attached to side surfaces of the transparent main body part 17, except for the end surface thereof on which the protruding part 10 is provided, to thereby form the reflecting part 21.

As illustrated in FIG. 4, the protruding part 12 is provided on a side opposed (opposite side) to the LED housing concave parts 20. A thickness of the protruding part 18 is set to be smaller than a thickness of the transparent main body part 17, and a width of the protruding part 18 is set to be smaller than a width of the transparent main body part 17. That is, it can be said that the protruding part 13 is formed by protruding a part of the end surface (a surface opposite to the LED housing concave part 20) of the transparent main body part 17. Then, the white tape is attached to an upper surface and a lower surface of the protruding part 18, to thereby form the reflecting part 21.

An operation of the thus configured reader/writer device 1 for the noncontact communication medium is described with reference to the drawings.

Here, description is given of a state where, when the reader/writer device 1 for the noncontact communication medium performs the information processing (read/write processing) with the noncontact communication medium 2, the first light emitting part 7 and the second light emitting part 8 are caused to emit light in order to announce the result of the information processing (read/write success or read/write failure) with the noncontact communication medium 2.

FIG. 5 is a cross sectional view for describing the state where the first light emitting part 7 and the second light emitting part 3 are caused to emit light. When the LED 9 serving as a light source is lit in response to the result of the information processing with the noncontact communication medium 2, as illustrated in FIG. 5, the light which has entered the light guide plate 10 is diffusely reflected by the diffusely reflecting part 19 on the lower surface of the transparent main body part 17. Then, the first light emitting part 7 on the upper surface side of the transparent main body part 17 (the upper side in FIG. 5) emits light. In addition, the light which has entered the light guide plate 10 is transmitted through the transparent main body part 17 to be guided to a leading end of the protruding part 13. Then, the second light emitting part a at the leading end of the protruding part 18 (the left end in FIG. 5) emits light.

In the reader/writer device 1 for the noncontact communication medium according to the embodiment of the present invention as described above, the second light emitting part 8 is provided at the leading end of the protruding part 12 of the light guide plate 10. Accordingly, even in the case where the first light emitting part 7 of the transparent main body part 17 of the light guide plate 10 is covered by the noncontact communication medium 2, the second light emitting part 8 makes it possible to easily check the light emitting state (the result of the information processing with the noncontact communication medium 2).

In this case, it is possible to emit light at the same time with a small number of components in a large range, a plurality of directions, and a plurality of portions. Further, even in the case where an entire surface of the reader/writer part 3 is covered by the noncontact communication medium 2 or the like and information exchange with the noncontact communication medium 2 cannot be visually Observed by a change of the first light emitting part 7, it is possible to check the information exchange by a change of the second light emitting part 8. Therefore, even in the case where, the information exchange with the noncontact communication medium 2 cannot be checked by a sound, it is possible to easily check the operation of the reader/writer device 1 for the noncontact communication medium.

Specifically, the light inputted from the light source is diffusely reflected by the diffusely reflecting part 19 of the transparent main body part 17, so that the light emitting planar part (first light emitting part 7) on the upper surface side of the transparent main body part 17 emits light. At the same time, the light inputted from the light source is transmitted through the transparent main body part 17, so that the light emitting end part (second light emitting part 8) at the leading end of the protruding part 13 emits light. At this time, because the reflecting part 21 is provided on each of the upper surface side and the lower surface side of the protruding part 18, it is possible to prevent the light from leaking to the outside through the upper surface side and the lower surface side of the protruding part 18, which enables suppressing a reduction in light amount of the light emitting end part (second light emitting part 8).

In addition, the reflecting part 21 is formed at each of the position corresponding to the first light emitting part 7 on the lower surface of the transparent main body part 17, the position corresponding to the LED housing concave part 20 on the upper surface of the transparent main body part 17, and the positions of the side surfaces of the transparent main body part 17, except for the end surface thereof on which the protruding part 18 is provided. Accordingly, it is possible to prevent the light which has entered the light guide plate 10 from leaking to the outside through a portion other than the two light emitting parts 7 and 8, which enables suppressing a reduction in light amount of the two light emitting parts 7 and 8.

In the reader/writer device 1 for the noncontact communication medium using the light guiding device as described above, in the case where an area of the light emitting planar part (first light emitting part 7) is made smaller than that of the noncontact communication medium 2, even if the entire surface of the reader/writer part 3 is covered by the noncontact communication medium 2, the light emitting end part (second light emitting part 8) enables a user who performs the data input operation to easily check the light emitting state indicating the result of the information processing with the noncontact communication medium 2. Accordingly, it is possible to make smaller the area of the light emitting planar part (first light emitting part 7), to thereby downsize the device.

Hereinabove, the embodiment of the present invention is described by way of example. The scope of the present invention is not limited thereto, and hence the present invention can be changed and modified in accordance with the purpose within the range described in the claims.

For example, the above description is given of the example where a single light emitting end part (second light emitting part 8) is provided in the light guide plate 10. The scope of the present invention is not limited thereto, and hence a plurality of light emitting end parts may be provided in the light guide plate 10.

Figure 6:
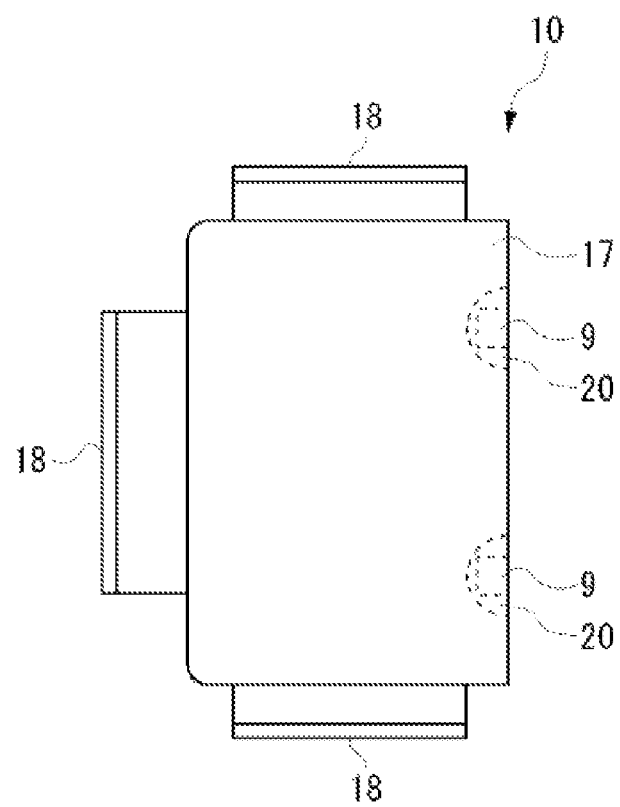
FIG. 6 is a plan view of a light guide plate according to another embodiment.

FIG. 6 is a plan view illustrating the light guide plate 10 according to another embodiment. In the example illustrated in FIG. 6, the light guide plate 10 includes the transparent main body part 17 having a substantially quadrilateral shape, and the protruding part 18 is provided on each of end surfaces of three sides (the three sides other than a side on which the LED housing concave part 20 is provided) of the transparent main body part 17. The three protruding parts 18 protrude in directions different from each other by 90 degrees (upward, leftward, and downward in FIG. 6).

Similarly to the embodiment of FIG. 5, the white tape is attached to the upper surface and the lower surface of each of the three protruding parts 18, to thereby form the reflecting part 21. Then, the light emitting end part second light emitting part 8) is provided at a leading end of each of the three protruding parts 15. That is, the light guide late 10 is provided with the three light emitting end parts (second light emitting parts 8).

In the light guide plate 10 as described above, the light emitting planar part (first light emitting part 7) on the upper surface side of the transparent main body part 17 emits light, and at the same time, the light emitting end parts (second light emitting parts 8) at the leading ends of the three protruding parts 13 emit light. In the reader/writer device, 1 for the noncontact communication medium using the light guiding device as described above, the light emitting end parts (second light emitting parts 8) are provided so as to respectively face users in three directions, whereby each of the three users can easily check the light emitting state indicating the result of the information processing with the noncontact communication medium 2.

For example, if one of the three light emitting end parts (second light emitting parts 8) is provided so as to face a shop clerk and the other two thereof are provided so as to face customers, even if the entire surface of the reader/writer part 3 is covered by the noncontact communication medium 2, each of the shop clerk and two customers can easily check the light emitting state indicating the result of the information processing with the noncontact communication medium 2.

In addition, the above description is given of the example where the light source is disposed in a lateral part of the light guide plate 10. The scope of the present invention is not limited thereto, and hence the light source may be disposed below the light guide plate 10.

Figure 7:
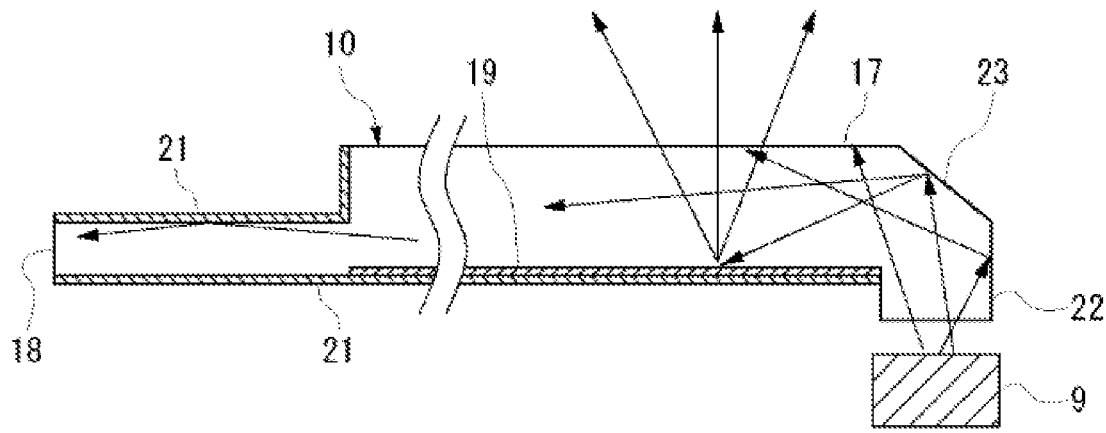
FIG. 7 is a cross sectional view of a light guide plate according to still another embodiment.

FIG. 7 is a cross sectional view illustrating the light guide plate 10 according to still another embodiment. In the example illustrated in FIG. 7, the LED 9 serving as a light source is disposed on a lower surface side of the light guide plate 10. Then, the light guide plate 10 is provided with a light entrance part 22 through which the light. is inputted from the LED 9 disposed on the lower surface side of the transparent main body part 17.

In addition, in the transparent main body part 17, a light direction change part 23 which changes a direction of the light which has entered through the light entrance part 22 toward the light emitting end part (second light emitting part 8) is provided at a position corresponding to the light entrance part 22. In this example, the direction of the light which has entered from the lower surface side (the lower side in FIG. 7) is changed by approximately 90 degrees toward the light emitting end part (the left side in FIG. 7).

In the light guide plate 10 as described above, the light source (LED 9 and the like) can be disposed on the lower surface side of the light guide plate 10, and hence a degree of freedom in design is enhanced, to thereby downsize the device.

Figure 8:
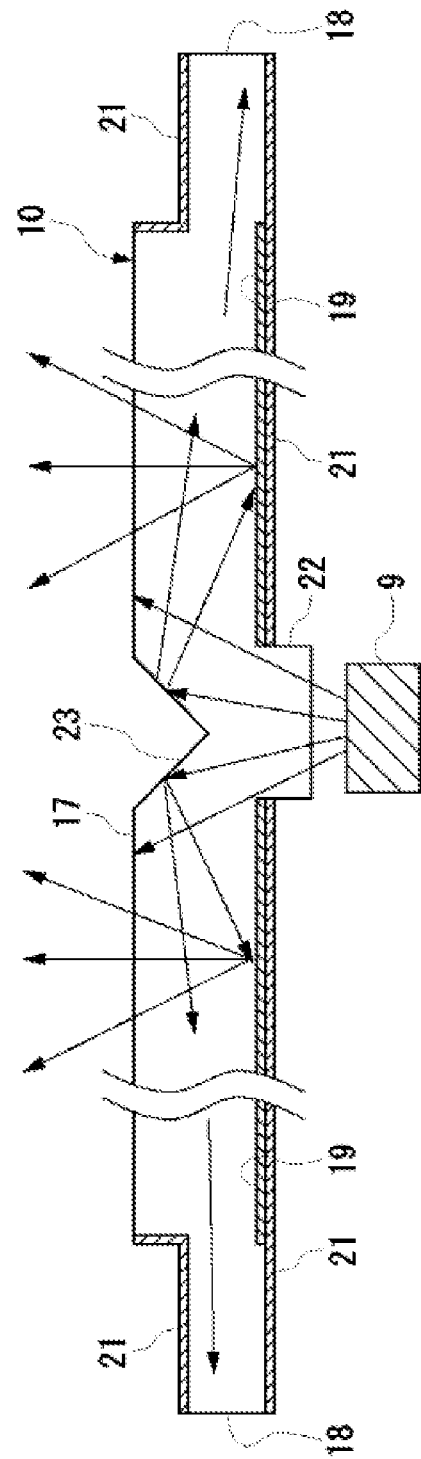
FIG. 8 is a cross sectional view of a light guide plate according to further another embodiment.

FIG. 3 is a cross sectional view illustrating the light guide plate 10 according to further another embodiment. In the example illustrated in FIG. 8, similarly to the example of FIG. 7, the LED 9 serving as a light source is disposed on the lower surface side of the light guide plate 10. In this case, the LED 9 is disposed in a substantially central part of the light guide plate 10. Then, the light entrance part 22 through which the light is inputted from the LED 9 disposed on the lower surface side of the transparent main body part 17 is provided in the central part of the light guide plate 10.

In addition, in the transparent main body part 17, the light direction change part 23 which changes the direction of the light which has entered through the light entrance part 22 toward the light emitting end part (second light emitting part 8) is provided at a position (in this case, the substantially central part) corresponding to the light entrance part 22. In this example, the light emitting end part (second light emitting part 8) is provided on an entire periphery of the end surface of the transparent main body part 17. Accordingly, all the directions of the light which has entered from the lower surface side (the lower side in FIG. 8) are changed by approximately 90 degrees toward the light emitting end part (both the right and left sides in FIG. 8).

In the light guide plate as described above, the light emitting end part is provided on the entire periphery of the transparent main body part. Therefore, when the entire surface of the reader/writer part is covered by the noncontact communication medium, each of users in all the directions can easily check the light emitting state indicating the result of the information processing with the noncontact communication medium.

In addition, the above description is given of the example where the first light emitting part and the second light emitting part are caused to emit light using the same LED. The scope of the present invention is not limited thereto, and hence the first light emitting part and the second light emitting part may be caused to emit light using different LEDs.

Hereinabove, the preferred embodiments of the present invention which can be conceived at present are described. It is understood that various modifications of the present embodiments are possible, and it is intended that the attached claims encompass all such modifications, which fall within the true spirit and range of the present invention.

INDUSTRIAL APPLICABILITY

As described above, the light guiding device according to the present invention has an effect that, in the case where the first light emitting part of the transparent main body part of the light guide plate is covered, the second light emitting part makes it possible to easily check the light emitting state, and is effectively used for the reader/writer device for the noncontact communication medium and the like.

The invention claimed is:
1. A reader/writer device comprising:
a reader/writer part which has a communication surface for communication with a noncontact communication medium,
a first light emitting part which is provided at the communication surface and which emits light when communicating with the noncontact communication medium or when conducting information processing therewith,
a second light emitting part which is provided at an outer position of the communication surface and which emits light when communicating with the noncontact communication medium or when conducting information processing therewith,
a light source which emits light when communicating with the noncontact communication medium or when conducting information processing, and
a light guide part which guides the light emitted by the light source to the first light emitting part and the second light emitting part.

2. The reader/writer device according to claim 1, wherein the second light emitting part is disposed around the reader/writer part.

3. The reader/writer device according to claim 1, wherein the second light emitting part is disposed on a side surface around the reader/writer part.

4. The reader/writer device according to claim 1, wherein the first light emitting part and the second light emitting part change light emitting state thereof together when communicating with the noncontact communication medium or when conducting information processing.

5. The reader/writer device according to claim 1, wherein the light source changes a light emitting state thereof when communicating with the noncontact communication medium or when conducting information processing.

6. The reader/writer device according to claim 1, wherein the light guide part comprises:
a light entering part in which the light emitted by the light source is entered,
a first light path which guides the light entered in the light entering part to the first light emitting part, and
a second light path which guides the light entered in the light entering part to the second light emitting part, wherein
a light path change part which changes the first light path or the second light path to the other is provided at least in the first light path or the second light path.

7. The reader/writer device according to claim 1, wherein the information processing is reading/writing the noncontact communication medium and
a light emitting state when read/write success is different from the light emitting state when read/write failure.

8. The reader/writer device according to claim 1, further comprising an input operation part which performs a data input operation for the information processing with the noncontact communication medium, wherein
the second light emitting part is disposed between the reader/writer part and the input operation part.

9. The reader/writer device according to claim 8, further comprising a liquid crystal display part which displays a result of the information processing with the noncontact communication medium or a result of the data input by the input operation part, wherein
the second light emitting part is disposed between the reader/writer part and the liquid crystal display part.

10. An electronic apparatus, comprising the reader/writer device according to claim 1.

11. A settlement terminal, comprising the reader/writer device according to claim 1.

12. A reader/writer device comprising:
a reader/writer part which has a communication surface which is a surface for communication with a noncontact communication medium,
a first light emitting part, at least part of which is covered by the noncontact communication medium when the noncontact communication medium is positioned over the communication surface so that communication with the noncontact communication medium can be conducted,
wherein the first light emitting part emits light when communicating with the noncontact communication medium or when conducting information processing,
a second light emitting part which is provided at a position apart from the first light emitting part, and which emits light when communicating with the noncontact communication medium or when conducting information processing,
a light source which emits light when communicating with the noncontact communication medium or when conducting information processing, and
a light guide part which guides the light emitted by the light source to the first light emitting part and the second light emitting part.

13. The reader/writer device according to claim 12, wherein the second light emitting part is disposed around the reader/writer part.

14. The reader/writer device according to claim 12, wherein the second light emitting part is disposed on a side surface around the reader/writer part.

15. The reader/writer device according to claim 12, wherein the first light emitting part and the second light emitting part change a light emitting state thereof together when communicating with the noncontact communication medium or when conducting information processing.

16. The reader/writer device according to claim 12, wherein the light source changes a light emitting state thereof when communicating with the noncontact communication medium or when conducting information processing.

17. The reader/writer device according to claim 12, wherein the light guide part comprises:
a light entering part in which light the emitted by the light source is entered,
a first light path which guides the light entered in the light entering part to the first light emitting part, and
a second light path which guides the light entered in the light entering part to the second light emitting part, wherein
a light path change part which changes the first light path or the second light path to the other is provided at least in the first light path or the second light path.

18. The reader/writer device according to claim 12, wherein the information processing is reading/writing the noncontact communication medium and
a light emitting state when read/write success is different from the light emitting state when read/write failure.

19. The reader/writer device according to claim 12, further comprising an input operation part which performs a data input operation for the information processing with the noncontact communication medium, wherein
the second light emitting part is disposed between the reader/writer part and the input operation part.

20. The reader/writer device according to claim 12, further comprising a liquid crystal display part which displays a result of the information processing with the noncontact communication medium or a result of the data input by the input operation part, wherein
the second light emitting part is disposed between the reader/writer part and the liquid crystal display part.

21. An electronic apparatus, comprising the reader/writer device according to claim 12.

22. A settlement terminal, comprising the reader/writer device according to claim 12.

23. A reader/writer device comprising:
a reader/writer part which has a communication surface which is a surface for communication with a noncontact communication medium, a first light emitting part which is provided at the communication surface, and which emits light when communicating with the noncontact communication medium or when conducting information processing, a second light emitting part which is provided at a non-communication surface which is not the surface for communication, and which emits light when communicating with the noncontact communication medium or when conducting information processing, a light source which emits light when communicating with the noncontact communication medium or when conducting information processing, and a light guide part which guides the light emitted by the light source to the first light emitting part and the second light emitting part.

24. The reader/writer device according to claim 23, wherein the second light emitting part is disposed around the reader/writer part.

25. The reader/writer device according to claim 23, wherein the second light emitting part is disposed on a side surface around the reader/writer part.

26. The reader/writer device according to claim 23, wherein the first light emitting part and the second light emitting part change a light emitting state thereof together when communicating with the noncontact communication medium or when conducting information processing.

27. The reader/writer device according to claim 23, wherein the light source changes a light emitting state thereof when communicating with the noncontact communication medium or when conducting information processing.

28. The reader/writer device according to claim 23, wherein the light guide part comprises:

a light entering part in which the light emitted by the light source is entered, a first light path which guides the light entered in the light entering part to the first light emitting part, and a second light path which guides the light entered in the light entering part to the second light emitting part, wherein a light path change part which changes the first light path or the second light path to the other is provided at least in the first light path or the second light path.

29. The reader/writer device according to claim 23, wherein the information processing is reading/writing the noncontact communication medium and a light emitting state when read/write success is different from the light emitting state when read/write failure.

30. The reader/writer device according to claim 23, further comprising an input operation part which performs a data input operation for the information processing with the noncontact communication medium, wherein the second light emitting part is disposed between the reader/writer part and the input operation part.

31. The reader/writer device according to claim 23, further comprising a liquid crystal display part which displays a result of the information processing with the noncontact communication medium or a result of the data input by the input operation part, wherein the second light emitting part is disposed between the reader/writer part and the liquid crystal display part.

32. An electronic apparatus, comprising the reader/writer device according to claim 23.

33. A settlement terminal, comprising the reader/writer device according to claim 23.

* * * * *